US012535192B2

(12) United States Patent
Hu

(10) Patent No.: US 12,535,192 B2
(45) Date of Patent: Jan. 27, 2026

(54) METHOD FOR MANUFACTURING ENVIRONMENT-ADAPTIVE INDUCTION LAMP STRING AND INDUCTION LAMP STRING

(71) Applicant: Shenzhen Linktop IOT Co., Ltd, Shenzhen (CN)

(72) Inventor: Peipei Hu, Shenzhen (CN)

(73) Assignee: Shenzhen Linktop IOT Co., Ltd, Shenzhen (CN)

( * ) Notice: Subject to any disclaimer, the term of this patent is extended or adjusted under 35 U.S.C. 154(b) by 0 days.

(21) Appl. No.: 19/281,635

(22) Filed: Jul. 26, 2025

(65) Prior Publication Data

US 2025/0354666 A1 Nov. 20, 2025

(30) Foreign Application Priority Data

May 26, 2025 (CN) ......................... 202510679889.9

(51) Int. Cl.

| | |
|---|---|
| ***F21S 4/10*** | (2016.01) |
| ***F21V 17/10*** | (2006.01) |
| ***F21V 23/04*** | (2006.01) |
| ***F21V 29/70*** | (2015.01) |
| ***F21V 31/00*** | (2006.01) |

(52) U.S. Cl.

CPC .............. *F21S 4/10* (2016.01); *F21V 17/105* (2013.01); *F21V 23/0442* (2013.01); *F21V 29/70* (2015.01); *F21V 31/005* (2013.01)

(58) Field of Classification Search

CPC ........ F21S 4/26; F21S 4/10; F21S 4/00; F21S 4/20; F21S 4/22; F21W 2131/10; F21V 23/001; F21V 15/01; F21V 17/10; F21V 31/00; F21V 29/40; F21V 23/04

See application file for complete search history.

(56) References Cited

U.S. PATENT DOCUMENTS

| | | | | |
|---|---|---|---|---|
| 8,449,145 B1 * | 5/2013 | Berry | ...................... | F21V 21/34 362/249.02 |
| 11,228,735 B2 * | 1/2022 | Chien | .................... | H04N 7/181 |
| 2010/0296285 A1 * | 11/2010 | Chemel | .................. | H05B 47/11 362/249.1 |
| 2012/0235579 A1 * | 9/2012 | Chemel | .................. | F21V 14/02 315/152 |

(Continued)

*Primary Examiner* — William J Carter
(74) *Attorney, Agent, or Firm* — Zhigang Ma

(57) ABSTRACT

The invention relates to the technical field of induction lamp manufacturing, and discloses a method for manufacturing an environment-adaptive induction lamp string and an induction lamp string. The induction lamp string comprises connecting wires, magnetic couplers, composite shielding modules, composite heat dissipation modules, an environmental sensor, and a control center. The invention primarily addresses the problem of the lack of environmentally adaptive coordination in adjusting the luminous effect and shielding performance found in the prior art. Through the synergistic action of the composite shielding modules and the environmental sensor, adaptive adjustment of electromagnetic radiation is achieved. Magnetic coupling shielding components, in conjunction with parallel-wound coils and shielding coatings, work together with metal grids to enhance the electromagnetic radiation protection of the induction lamp.

10 Claims, 6 Drawing Sheets

(56) References Cited

U.S. PATENT DOCUMENTS

| | | | | |
|---|---|---|---|---|
| 2015/0103540 | A1 | 4/2015 | Han | |
| 2020/0267810 | A1* | 8/2020 | Chemel | H05B 47/19 |
| 2021/0164639 | A1* | 6/2021 | Choi | F21V 23/001 |
| 2024/0200737 | A1 | 6/2024 | Yang | |
| 2024/0384842 | A1 | 11/2024 | Zou | |

* cited by examiner

METHOD FOR MANUFACTURING ENVIRONMENT-ADAPTIVE INDUCTION LAMP STRING AND INDUCTION LAMP STRING

BACKGROUND OF THE INVENTION

Technical Field

The invention relates to the technical field of induction lamp manufacturing, in particular to a method for manufacturing an environment-adaptive induction lamp string and an induction lamp string.

Description of Related Art

Induction lamps, short for high-frequency plasma discharge induction lamps, are high-tech products developed by integrating the latest technological advancements in optics, power electronics, plasma science, and magnetic materials. They represent a new type of light sources that embody the future direction of lighting technology with high luminous efficacy, long lifespan, and excellent color rendering. Unlike traditional electric light sources, induction lamps do not have electrodes, resulting in significantly longer lifespans and minimal light decay during their lifetime due to the absence of electrode material effects. Induction lamps meet the requirements for high efficiency, energy conservation, and environmental protection, making the replacement of traditional electric light sources with induction lamps an inevitable trend. Induction lamps on the market now are typically installed in lighting fixtures. Due to the operating frequency and power of induction lamps, they generate significant electromagnetic radiation during operation. To use induction lamps safely, it is necessary to block this electromagnetic radiation. However, the existing methods for blocking electromagnetic radiation from induction lamps involve placing a metal mesh on the outer side of a lamp casing. This processing method is complex and does not effectively shield against electromagnetic radiation during use. Additionally, the use of multi-layer wire meshes can negatively impact the lighting effectiveness of induction lamps.

The prior art disclosed under publication number CN219087704U describes an induction lamp designed to prevent electromagnetic radiation leakage. The induction lamp features a mounting base structured as a rectangular plate, with a limiting frame installed inside. Each of the two ends of the limiting frame is connected to a docking component through a snap-fit, and induction lamp assemblies are symmetrically engaged inside the docking components. The outer wall surface of the induction lamp assembly is covered by a protective component. The inner wall of the mounting base is symmetrically provided with wave-absorbing foam, which has wave-absorbing patches adhered to the surface. Additionally, the outer surface of the mounting base is connected to a lampshade component through a snap-fit. The docking component comprises a docking tube installed on the inner wall surface of a groove of the mounting base. The induction lamp designed to prevent electromagnetic radiation leakage features a dual-layer protective structure formed by protective components inside the device and the lampshade component. This design reduces the radiation emitted by the induction lamp during operation. When in use, the mounting base and the lampshade component are connected in a snap-fit manner for precise positioning, effectively providing electromagnetic radiation protection for the induction lamp and minimizing the impact on surrounding electronic devices.

Regarding the aforementioned and existing related technologies, the inventor identifies the following deficiencies.

1. The prior art only achieves electromagnetic radiation protection through static physical structures such as isolation covers, metal meshes, and wave-absorbing surfaces, which is passive shielding and cannot dynamically adjust protective effectiveness based on real-time changes in environmental parameters.
2. The protective strategy in the prior art follows a single fixed mode and does not incorporate differentiated protective logic for various application scenarios. For instance, in industrial settings, the priority is to suppress radiation to avoid interference with precision equipment, while in home environments, the focus should be on adaptive brightness adjustment.
3. The prior art only passively weakens radiation through the electromagnetic energy-to-thermal energy conversion of wave-absorbing materials, without incorporating active electromagnetic suppression components. As a result, the ability of equipment to suppress high-frequency magnetic field leakage is limited.
4. In the prior art, the protective component and the heat dissipation component are designed independently. During high-power operation, insufficient heat dissipation may lead to a decline in the performance of shielding materials.

BRIEF SUMMARY OF THE INVENTION

The invention seeks to address the technical problem of the lack of environmentally adaptive coordination in adjusting the luminous effect and shielding performance found in the prior art, and proposes a method for manufacturing an environment-adaptive induction lamp string and an induction lamp string.

To achieve the above objective, the present application adopts the following technical scheme. An environment-adaptive induction lamp string comprises connecting wires and lampshades, wherein a magnetic coupler is arranged inside each lampshade, and a composite shielding module is installed on an inner wall of the lampshade, positioned outside the magnetic coupler; one end of the induction lamp string is equipped with an environmental sensor, a signal transmission end of the environmental sensor is provided with a control center, and the control center dynamically adjusts the luminous parameters of the magnetic coupler and the shielding effectiveness of the composite shielding module based on environmental data collected by the environmental sensor; the composite shielding module comprises a magnetic coupling shielding component, a lampshade shielding component, and a wire shielding component; the magnetic coupling shielding component is located outside the magnetic coupler and consists of a shielding coating and a parallel-wound coil oriented opposite to a magnetic field direction; the lampshade shielding component is positioned inside the lampshade and consists of a radiation-resistant film on an inner wall of the lampshade and a metal grid outside the lampshade; and the wire shielding component is fitted around the connecting wire and consists of an insulating layer outside the connecting wire, a shielding layer surrounding the insulating layer, and a rubber protective layer.

Preferably, a composite heat dissipation module is installed inside the magnetic coupler and comprises a metal core rod, a magnetic core is arranged inside the metal core rod, and cooling fins are installed on two ends of the metal core rod; a thermal conduction rod is positioned at a center of the magnetic core, with one end embedded inside the magnetic core and the other end fixedly connected to the cooling fins; and a phase change thermal storage layer is placed between the metal core rod and the magnetic core.

Preferably, outer apertures of the metal grid gradually expand from bottom to top, and a surface of the metal grid is covered with a hydrophobic layer formed by radiation-resistant paint.

Preferably, the environmental sensor comprises a brightness sensor, a temperature sensor, a radiation sensor, and an infrared sensor, and the other end of the induction lamp string is equipped with a relative light sensor.

Preferably, the control center adjusts the luminous and shielding performance using a scene weighting algorithm, with the formula for the weighting algorithm as follows:

$$Bm = By \times \left[1 - \alpha\left(\frac{Lnow}{L\max}\right)\right] + M \times \beta \times Bup$$

where Bm represents object brightness, By is the reference brightness set for the current induction lamp, α is the weighting coefficient, Lmax is the maximum brightness value, Lnow is the current ambient light intensity, M is the human activity intensity, and β×Bup is the brightness increment.

A method for manufacturing an environment-adaptive induction lamp string, used for manufacturing the environment-adaptive induction lamp string as described above, comprises the following steps:

S1, applying radiation-resistant paint onto an inner wall of a lampshade, covering the same with a transparent protective layer, and fitting a sealing ring at an edge of the lampshade;

S2, sequentially fitting an insulating layer, a shielding layer, and a rubber protective layer around a connecting wire;

S3, assembling a metal grid and immersing the shaped metal grid in radiation-resistant paint;

S4, attaching a metal core rod to an outer side of a magnetic core, with a phase change thermal storage layer between the magnetic core and the metal core rod, inserting a thermal conduction rod into the magnetic core, and connecting the thermal conduction rod to the metal core rod via cooling fins;

S5, coating an outer surface of the metal core rod with a shielding coating and winding a reverse parallel-wound coil around the same;

S6, welding the connecting wires of individual induction lamps to form an induction lamp string, and installing an environmental sensor and a relative light sensor at two ends of the induction lamp string respectively; and S7, activating the induction lamps and measuring a difference between an electromagnetic radiation amount El and a threshold Ed, classifying as unqualified if El>Ed, covering the environmental sensor to verify the linked response, and validating the coordinated adjustment of lighting and shielding by changing environmental parameters.

Preferably, in S7, environmental data weights for the electromagnetic radiation threshold Ed are differentially allocated according to factory and home environments.

Preferably, in the factory setting, a temperature weight is ≥0.4 and a radiation weight is ≥0.3; and in the home setting, a brightness weight is ≥0.4 and a human activity weight is ≥0.3.

Preferably, in S3, by altering ambient brightness, temperature, and human activity intensity, it is detected whether the coordinated adjustment of the luminous parameters of the induction lamp and the shielding effectiveness of the composite shielding module is triggered.

Preferably, the composite shielding module and the environmental sensor are linked through the control center.

The invention has the following technical effects and advantages.

1. The invention collects environmental data in real time through multidimensional sensors, including brightness, temperature, radiation, and infrared sensors. The control center dynamically adjusts luminous parameters and shielding effectiveness based on the scene weighting algorithm. For example, when increased human activity is detected, the system simultaneously raises the brightness and enhances the reverse coil current of the magnetic coupling shielding component to offset the radiation increase caused by the power boost, achieving a dynamic balance between illumination and radiation safety. Unlike traditional passive wave-absorbing designs, the invention generates a reverse electric field through the reverse parallel-wound coil of the magnetic coupling shielding component to counteract common-mode interference. Combined with the high-frequency magnetic field reflection capability of the shielding coating, an active suppression mechanism that reduces radiation generation at the source is formed.
2. The composite shielding module forms a three-dimensional protective network through the collaboration of multiple components: the shielding coating and the reverse coil of the magnetic coupling shielding component actively suppress core radiation sources, the radiation-resistant film on the inner wall of the lampshade shielding component and the outer gradient metal grid achieve spatially differentiated protection for near-field shielding and far-field heat dissipation, and the three-layer structure of the wire shielding component mitigates conducted interference. Additionally, the composite heat dissipation module works in deep coordination with the shielding components: the metal core rod provides both magnetic field shielding and thermal conduction, the phase change thermal storage layer absorbs heat at high temperatures, and in coordination with the optimized heat dissipation design of the gradient metal grid, the decline in shielding performance due to insufficient heat dissipation in traditional structures is prevented.
3. The control center utilizes the scene weighting algorithm to achieve differentiated functional adaptations: in industrial scenarios, the priority is to suppress radiation and monitor temperature, while in home scenarios, the focus is on adaptive brightness and human activity response. Based on real-time environmental data, the system can dynamically balance between radiation suppression and lighting effectiveness. For example, when increasing brightness in low-light environments, the radiation increment is simultaneously calculated, optimizing both objectives by either reducing the increment or enhancing the reflection efficiency of the shielding coating, thus avoiding the limitations of fixed shielding modes.

4. This invention establishes a multidimensional detection system that ensures product reliability across diverse scenarios through quantitative measurement of electromagnetic radiation levels and an environmental adaptability detection process. The detection steps include control logic verification, providing a technical basis for the functional consistency of mass-produced products and addressing the lack of dynamic functional testing standards in the prior art.

BRIEF SUMMARY OF THE INVENTION

The disclosed content of the invention will be explained below by referring to the accompanying drawings. It should be understood that the figures are for illustrative purposes only and are not meant to restrict the protective scope of the invention. In the figures, the same reference numerals are used to denote the same components.

REFERENCE NUMERALS

1. Induction lamp string; 2. Connecting wire; 3. Magnetic coupler; 4. Composite shielding module; 41. Magnetic coupling shielding component; 411. Wound coil; 412. Shielding coating; 42. Lampshade shielding component; 421. Radiation-resistant film; 422. Metal grid; 43. Wire shielding component; 431. Insulating layer; 432. Shielding layer; 433. Rubber protective layer; 5. Composite heat dissipation module; 51. Metal core rod; 52. Magnetic core; 53. Cooling fin; 54. Thermal conduction rod; 55. Phase change thermal storage layer; 6. Environmental sensor; 7. Control center.

DETAILED DESCRIPTION OF THE INVENTION

It is easy to understand that, based on the technical scheme of the invention, those skilled in the art can propose various interchangeable structural forms and implementation methods without changing the essence of the invention. Therefore, the following specific embodiments and accompanying figures are merely exemplary illustrations of the technical scheme of the invention and should not be considered exhaustive or as limitations on the technical scheme of the invention.

Figure 1:
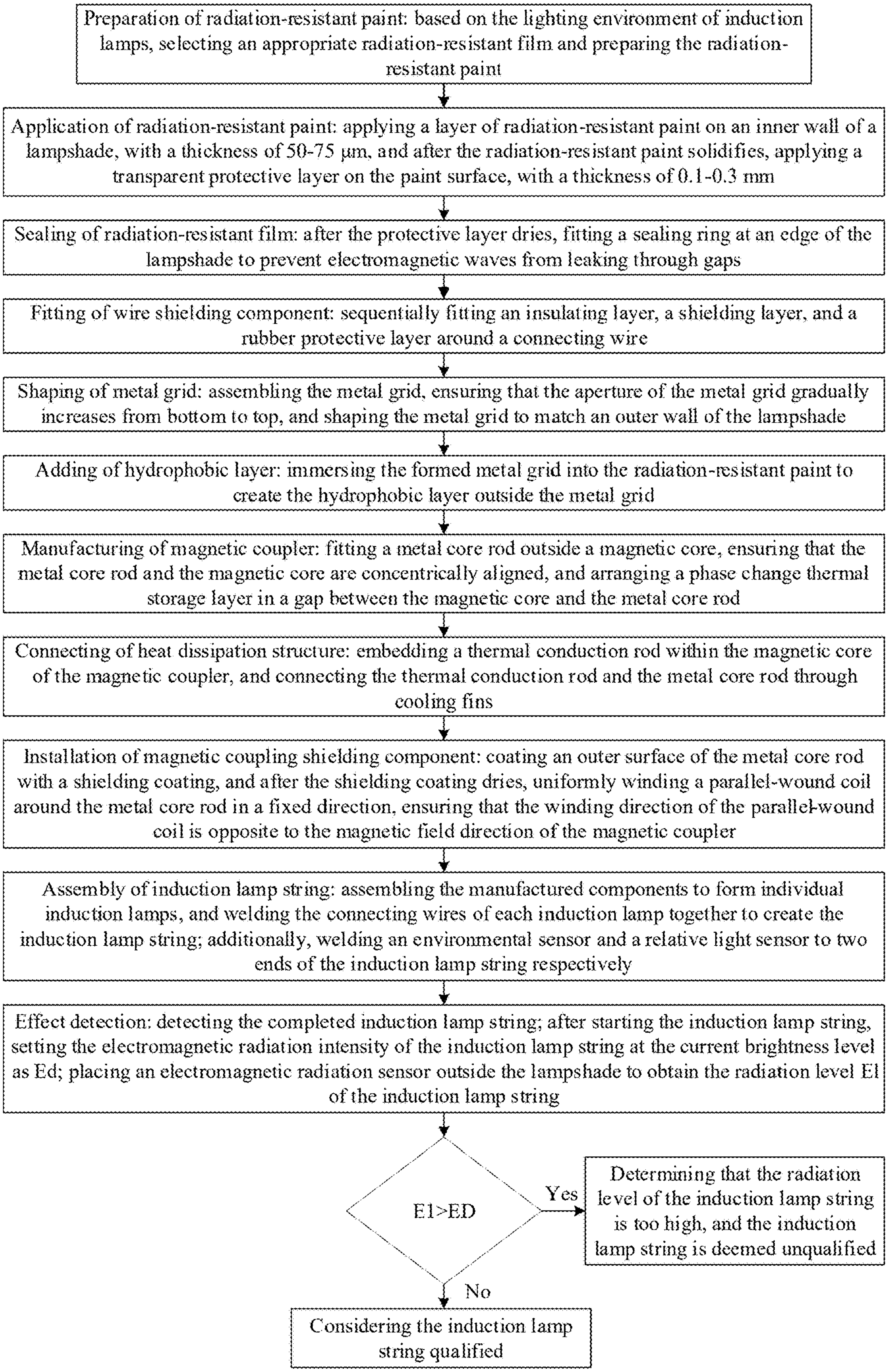
FIG. 1 is a flowchart of a manufacturing method of the invention.
Figure 2:
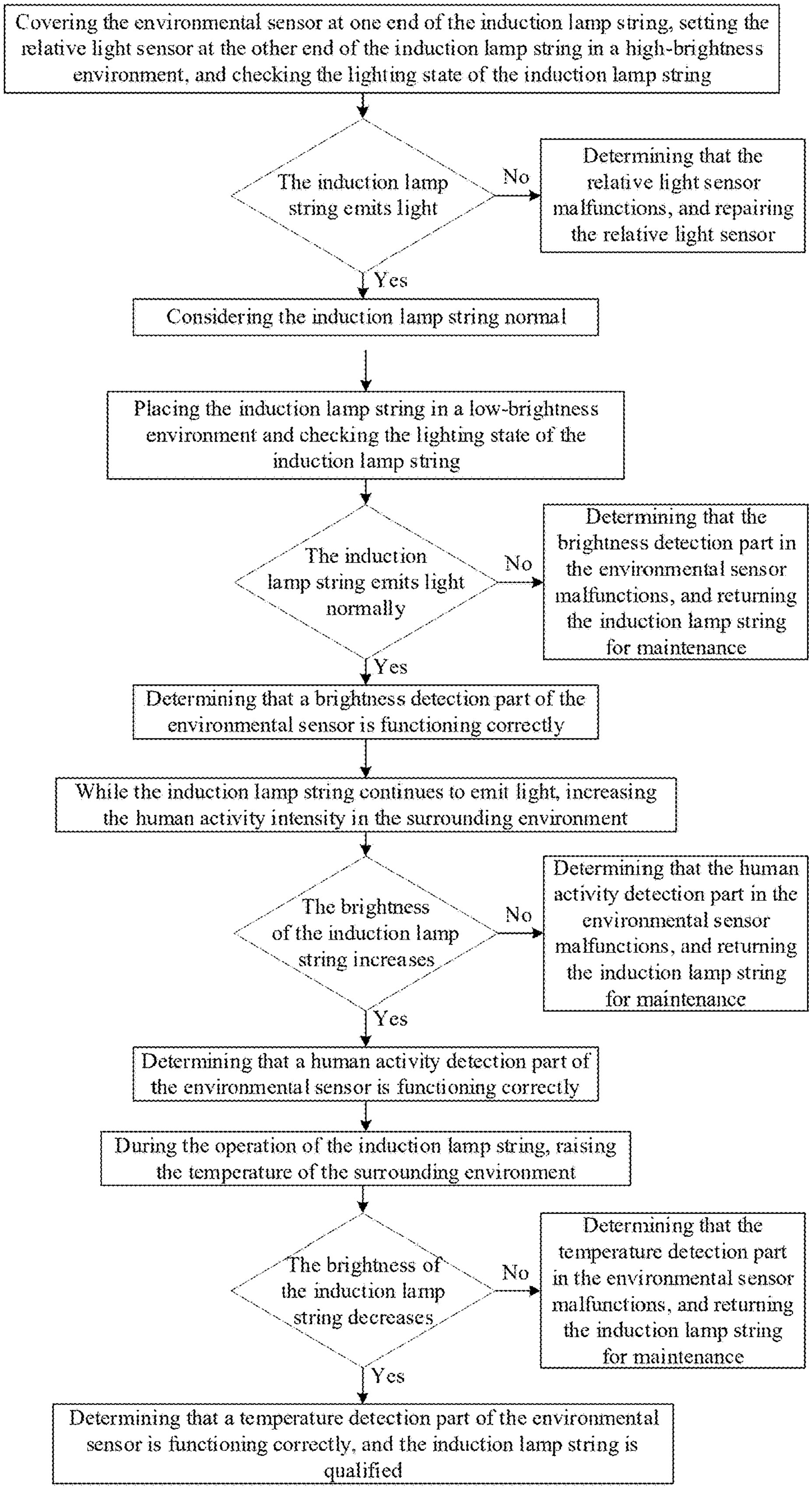
FIG. 2 is a flowchart of an environmental adaptability detection method of the invention.
Figure 3:
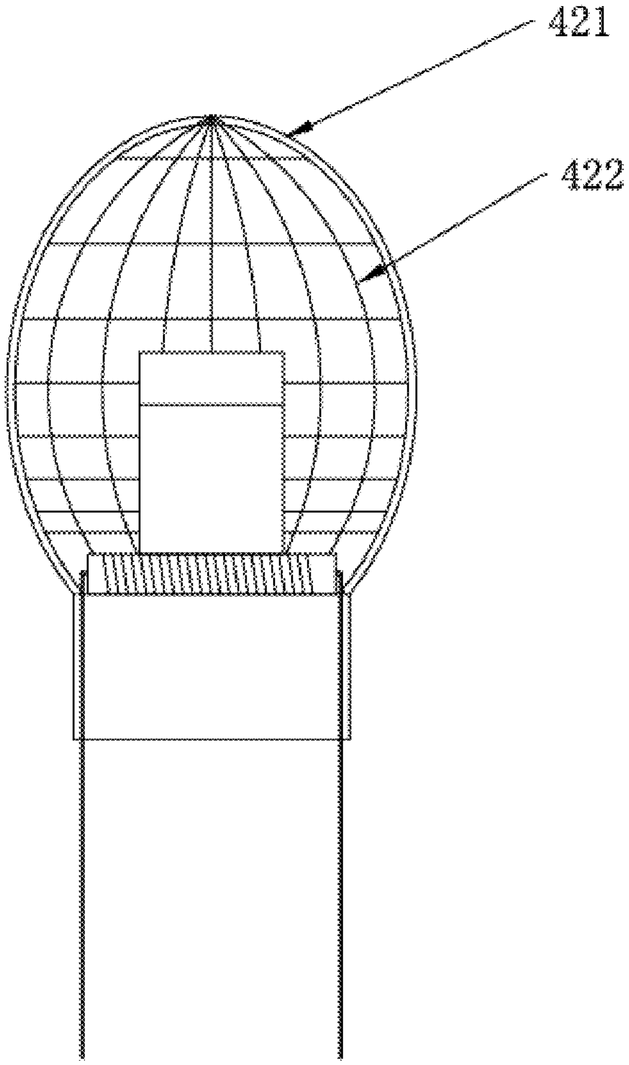
FIG. 3 is a partial planar structural diagram of the invention.
Figure 4:
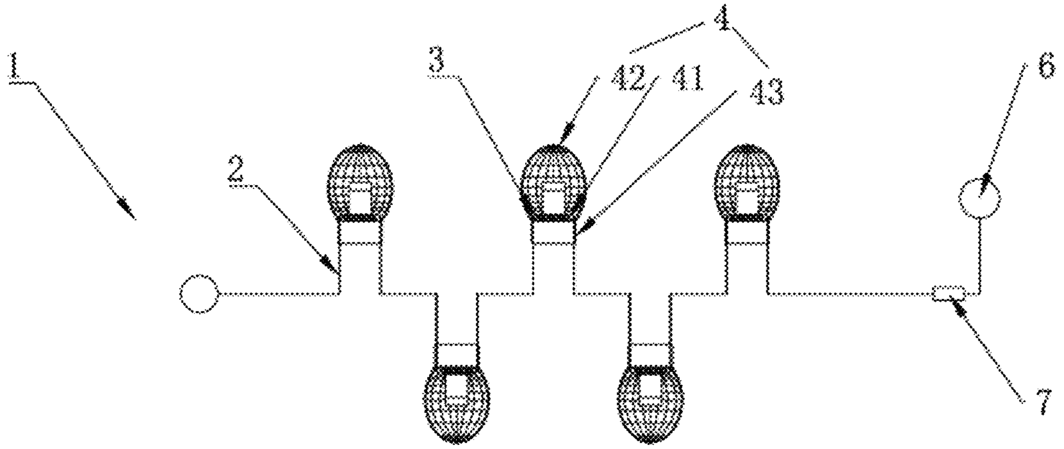
FIG. 4 is an overall planar structural diagram of the invention.

Referring to FIG. 1, the invention provides a technical scheme: a method for manufacturing an environment-adaptive induction lamp string comprises the following steps:

S1, preparation of radiation-resistant paint: based on the lighting environment of induction lamps, selecting an appropriate radiation-resistant film and preparing the radiation-resistant paint;

S2, application of radiation-resistant paint: applying a layer of radiation-resistant paint on an inner wall of a lampshade, with a thickness of 50-75 μm, and after the radiation-resistant paint solidifies, applying a transparent protective layer on the paint surface, with a thickness of 0.1-0.3 mm;

S3, sealing of radiation-resistant film: after the protective layer dries, fitting a sealing ring at an edge of the lampshade to prevent electromagnetic waves from leaking through gaps;

S4, fitting of wire shielding component 43: sequentially fitting an insulating layer 431, a shielding layer 432, and a rubber protective layer 433 around a connecting wire 2;

S5, shaping of metal grid 422: assembling the metal grid 422, ensuring that the aperture of the metal grid 422 gradually increases from bottom to top, and shaping the metal grid 422 to match an outer wall of the lampshade;

S6, adding of hydrophobic layer: immersing the formed metal grid 422 into the radiation-resistant paint from S1 to create the hydrophobic layer outside the metal grid 422;

S7, manufacturing of magnetic coupler 3: fitting a metal core rod 51 outside a magnetic core 52, ensuring that the metal core rod 51 and the magnetic core 52 are concentrically aligned, and arranging a phase change thermal storage layer 55 in a gap between the magnetic core 52 and the metal core rod 51;

S8, connecting of heat dissipation structure: embedding a thermal conduction rod 54 within the magnetic core 52 of the magnetic coupler 3, and connecting the thermal conduction rod 54 and the metal core rod 51 through cooling fins 53;

S9, installation of magnetic coupling shielding component 41: coating an outer surface of the metal core rod 51 with a shielding coating 412, and after the shielding coating 412 dries, uniformly winding a parallel-wound coil 411 around the metal core rod 51 in a fixed direction, ensuring that the winding direction of the parallel-wound coil 411 is opposite to the magnetic field direction of the magnetic coupler 3;

S10, assembly of induction lamp string 1: assembling the manufactured components to form individual induction lamps, and welding the connecting wires 2 of each induction lamp together to create the induction lamp string 1; additionally, welding an environmental sensor 6 and a relative light sensor to two ends of the induction lamp string 1 respectively; and S11, effect detection: detecting the completed induction lamp string 1; after starting the induction lamp string 1, setting the electromagnetic radiation intensity of the induction lamp string 1 at the current brightness level as Ed; placing an electromagnetic radiation sensor outside the lampshade to obtain the radiation level El of the induction lamp string 1; if El>Ed, determining that the radiation level of the induction lamp string 1 is too high, and the induction lamp string 1 is deemed unqualified; otherwise, considering the induction lamp string 1 qualified.

S11 also includes environmental adaptability detection, which consists of the following steps: S111, covering the environmental sensor 6 at one end of the induction lamp string 1, setting the relative light sensor at the other end of the induction lamp string 1 in a high-brightness environment, and checking the lighting state of the induction lamp string 1; if the induction lamp string 1 emits light, determining that the relative light sensor malfunctions, and repairing the relative light sensor; otherwise, deeming the induction lamp string 1 normal;

S112, placing the induction lamp string 1 in a low-brightness environment and checking the lighting state of the induction lamp string 1; if the induction lamp string 1 emits light normally, determining that a brightness detection part of the environmental sensor 6 is functioning correctly, and proceeding to S113 for human activity detection; conversely, if the induction lamp string 1 does not emit light, determining that the brightness detection part in the environmental sensor 6 malfunctions, and returning the induction lamp string 1 for maintenance;

S113, while the induction lamp string 1 continues to emit light, increasing the human activity intensity in the surrounding environment; if the brightness of the induction lamp string 1 increases, determining that a human activity detection part of the environmental sensor 6 is functioning correctly, and proceeding to S114 for temperature detection; conversely, if the brightness of the induction lamp string 1 remains unchanged, determining that the human activity detection part in the environmental sensor 6 malfunctions, and returning the induction lamp string 1 for maintenance; and S114, during the operation of the induction lamp string 1, raising the temperature of the surrounding environment; if the brightness of the induction lamp string 1 decreases, determining that a temperature detection part of the environmental sensor 6 is functioning correctly, and the induction lamp string 1 is qualified; conversely, if the brightness of the induction lamp string 1 remains unchanged, determining that the temperature detection part in the environmental sensor 6 malfunctions, and returning the induction lamp string 1 for maintenance.

Referring to FIGS. 3-6, the invention provides an induction lamp string produced based on the above manufacturing method. An environment-adaptive induction lamp string 1 comprises connecting wires 2 that connect individual induction lamps in series. A magnetic coupler 3 is installed inside a lampshade of each induction lamp, and a composite shielding module 4 is mounted on an inner wall of the lampshade, located outside the magnetic coupler 3. A composite heat dissipation module 5 is installed inside the magnetic coupler 3. One end of the induction lamp string 1 is equipped with an environmental sensor 6, and a signal transmission end of the environmental sensor 6 is provided with a control center 7.

Figure 5:
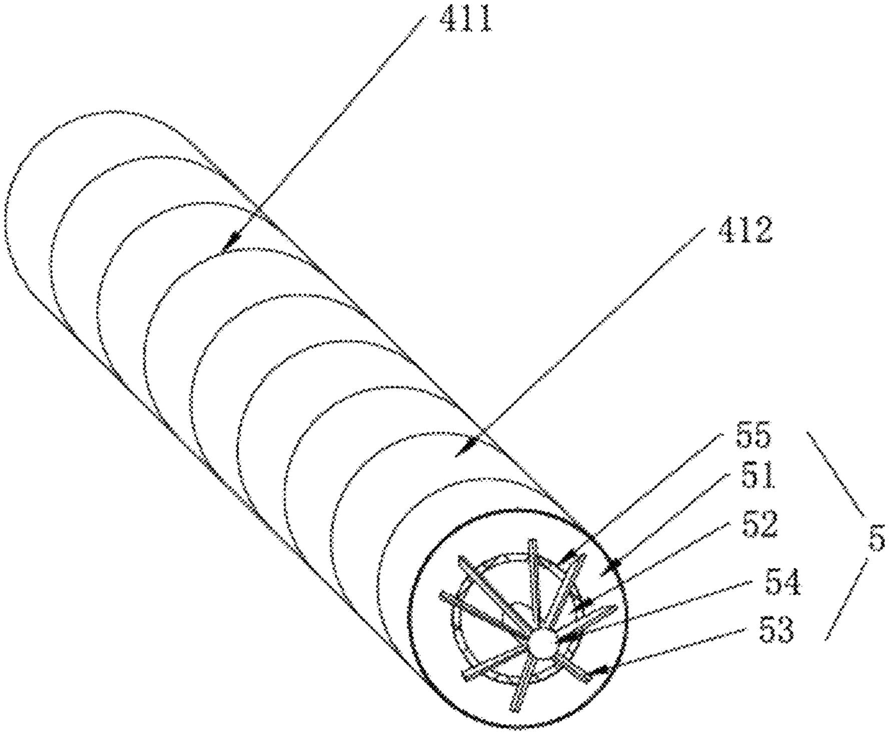
FIG. 5 is a partial perspective view of the invention.
Figure 6:
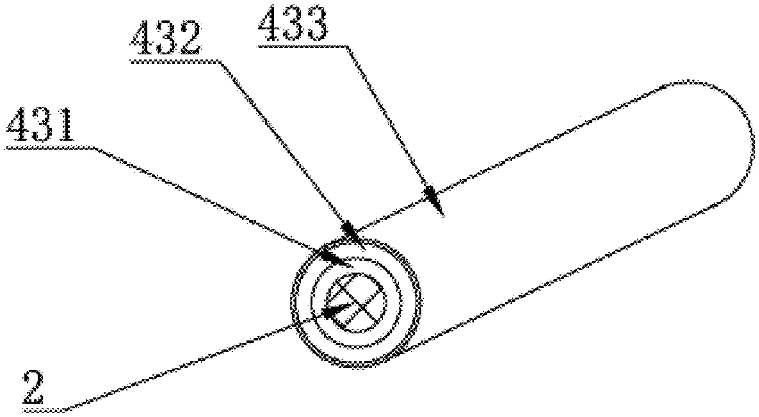
FIG. 6 is a partial perspective view of the invention.

Referring to FIG. 5, in this embodiment, the composite heat dissipation module 5 comprises a metal core rod 51, a magnetic core 52 arranged inside the metal core rod 51, cooling fins 53 installed on two ends of the metal core rod 51, and a thermal conduction rod 54 positioned at a center of the magnetic core 52; one end of the thermal conduction rod 54 is embedded inside the magnetic core 52 and the other end is fixedly connected to the cooling fins 53; and a phase change thermal storage layer 55 is placed between the metal core rod 51 and the magnetic core 52.

Referring to FIGS. 3-6, in this embodiment, the composite shielding module 4 comprises a magnetic coupling shielding component 41 arranged on the magnetic coupler 3, a lampshade shielding component 42 arranged in the lampshade, and a wire shielding component 43 arranged on the connecting wire 2.

The magnetic coupling shielding component 41 comprises a parallel-wound coil 411 wound around the metal core rod 51, and a shielding coating 412 applied to an outer surface of the metal core rod 51. The lampshade shielding component 42 consists of a radiation-resistant film 421 installed on an inner wall of the lampshade and a metal grid 422 outside the lampshade. The aperture of the metal grid 422 gradually increases from the bottom to the top of the lampshade along its length. Additionally, a surface of the metal grid 422 is provided with a hydrophobic layer. The wire shielding component 43 consists of an insulating layer 431 outside the connecting wire 2, a shielding layer 432 surrounding the insulating layer 431, and a rubber protective layer 433.

One end of the induction lamp string 1 is provided with an environmental sensor 6 through welding, and the other end is provided with a relative light sensor through welding. A signal transmission end of the environmental sensor 6 is provided with a control center 7 through electrical connection. The environmental sensor 6 comprises a brightness sensor, a temperature sensor, a radiation sensor, and an infrared sensor.

The integration of various shielding components within the composite shielding module 4, along with their synergistic interaction with the environmental sensor 6, achieves adaptive regulation of electromagnetic radiation within the induction lamp string 1. Through the combined action of the parallel-wound coil 411 and the shielding coating 412, the magnetic coupling shielding component 41, combined with the gradient metal grid 422 outside the lampshade, enhances the electromagnetic radiation protection of the induction lamp. Meanwhile, the environmental sensor 6 can monitor the surrounding environment of the induction lamp string 1 in real time, and the control center 7 adjusts the luminous effect and shielding performance based on the weights of various data in the scene, enabling the induction lamp string 1 to balance protection, energy consumption, and response speed in different environments.

By combining data from multiple sensors, including the brightness sensor, the radiation sensor, and the infrared sensor, and assigning weights to various parameters based on the lighting position of the induction lamp string 1, it enables adaptive brightness adjustment according to the current environmental conditions. For example, when the induction lamps are located in a factory environment, where mechanical automation is prevalent and human activity is minimal, it is necessary to monitor the working temperature of the induction lamp string 1 in real time to prevent safety incidents; moreover, the radiation intensity of the induction lamp string 1 should be kept at a low level to avoid interference with production machinery. Therefore, in a factory environment, the temperature weight of the induction lamp string 1 is set to 0.4, and the radiation weight is set to 0.3. Conversely, when the induction lamp string 1 is used for home lighting, it is essential to ensure that the brightness of the induction lamp string 1 can be automatically adjusted based on ambient light and the human activity intensity in the current environment. In this case, the brightness weight of the induction lamps is set to 0.4, and the human activity weight is set to 0.3. This weight configuration allows for fine-tuned adaptive adjustment of the brightness of the induction lamp string 1. For instance, when any sensor in the environmental sensor 6 detects a parameter exceeding a threshold, the control center 7 can automatically adjust the brightness of the induction lamp string 1, thereby reducing its brightness, radiation, and temperature. This mechanism prevents issues such as excessive temperature, high radiation, and overly bright lighting, ensuring safety while improving overall energy efficiency.

At the same time, to enhance the suppression and shielding effectiveness of electromagnetic radiation in the induction lamp string 1, the parallel-wound coil 411 within the magnetic coupler 3 generates a reverse electric field that can counteract the common-mode magnetic interference inside the magnetic coupler 3. Additionally, the shielding coating 412 outside the metal core rod 51 effectively suppresses high-frequency magnetic field leakage. The radiation-resistant film 421 on the inner wall of the lampshade is made of an aluminum oxide coating, which exhibits high stability in high-dose radiation environments. It resists embrittlement under radiation conditions and increases mechanical strength due to lattice structure reorganization. Simultaneously, the aluminum oxide coating maintains a high light transmittance while effectively reflecting or absorbing ultraviolet wavelengths, allowing it to transmit visible light for illumination while selectively shielding UV radiation. Moreover, the aluminum oxide coating retains structural and functional stability at high temperatures. The thermal stability enables the aluminum oxide coating to not only block UV rays after heating during the operation of the induction lamp, but also prevent coating cracking or failure caused by temperature rise. Through the combination of the shielding layer 432 and the rubber protective layer 433, the wire shielding component 43 ensures the flexibility of the connecting wire 2 while possessing a high resistance to magnetic field interference, thereby reducing the rate of conductive interference.

To prevent the temperature of the induction lamp string 1 from rising too quickly during operation, the composite heat dissipation module 5 is designed with a composite thermal conduction path using the metal core rod 51 and the thermal conduction rod 54, so as to allow heat within the magnetic coupler 3 to be conducted through the metal core rod 51 and the thermal conduction rod 54, and then dissipated through the cooling fins 53. The phase change material in the phase change thermal storage layer 55 can absorb heat at temperatures between 70° C. and 80° C., working in conjunction with the metal core rod 51 and the thermal conduction rod 54 to enhance overall heat dissipation. Additionally, the insulating layer 431 on the surface of the metal grid 422 is preferably made of a PTFE coating, which maintains stable physical and chemical properties over a wide temperature range. Further, the PTFE coating does not release volatile substances in high-temperature and high-humidity environments, ensuring the insulation performance of the metal grid 422. The PTFE coating also exhibits high hydrophobicity, preventing contaminants from adhering to the pores of the metal grid 422, which may lead to local electric field distortion or hinder heat dissipation.

As an optimization of the control method, when a change in human activity intensity is detected, the brightness needs to be adjusted. The increase in brightness should be based on the human activity intensity in the current area. Specifically, the increase in brightness is triggered synchronously with the increase in human activity, with the increase ratio between human activities and brightness being 1:1, resulting in the following formula:

$$Bm = By \times \left[1 - \alpha\left(\frac{Lnow}{L\max}\right)\right] + M \times \beta \times Bup$$

where Bm represents object brightness to be adjusted, By is the reference brightness set for the current induction lamp, α is the weighting coefficient assigned to the human activity intensity, Lmax is the maximum brightness value, Lnow is the current ambient light intensity, M is the currently detected human activity intensity, and β×Bup is the brightness increment triggered synchronously with the human activity intensity.

The technical scope of the invention is not limited to the contents described above. Those skilled in the art can make various modifications and changes to the above embodiments without departing from the technical spirit of the invention, and such modifications and changes should fall within the protection scope of the invention.

What is claimed is:

1. An environment-adaptive induction lamp string, comprising connecting wires and lampshades, wherein a magnetic coupler is arranged inside each lampshade, and a composite shielding module is installed on an inner wall of the lampshade, positioned outside the magnetic coupler; one end of the induction lamp string is equipped with an environmental sensor, a signal transmission end of the environmental sensor is provided with a control center, and the control center dynamically adjusts the luminous parameters of the magnetic coupler and the shielding effectiveness of the composite shielding module based on environmental data collected by the environmental sensor;

the composite shielding module comprises a magnetic coupling shielding component, a lampshade shielding component, and a wire shielding component;

the magnetic coupling shielding component is located outside the magnetic coupler and consists of a shielding coating and a parallel-wound coil oriented opposite to a magnetic field direction;

the lampshade shielding component is positioned inside the lampshade and consists of a radiation-resistant film on an inner wall of the lampshade and a metal grid outside the lampshade; and the wire shielding component is fitted around the connecting wire and consists of an insulating layer outside the connecting wire, a shielding layer surrounding the insulating layer, and a rubber protective layer.

2. The environment-adaptive induction lamp string according to claim 1, wherein a composite heat dissipation module is installed inside the magnetic coupler and comprises a metal core rod, a magnetic core is arranged inside the metal core rod, and cooling fins are installed on two ends of the metal core rod; a thermal conduction rod is positioned at a center of the magnetic core, with one end embedded inside the magnetic core and the other end fixedly connected to the cooling fins; and a phase change thermal storage layer is placed between the metal core rod and the magnetic core.

3. The environment-adaptive induction lamp string according to claim 1, wherein outer apertures of the metal grid gradually expand from bottom to top, and a surface of the metal grid is covered with a hydrophobic layer formed by radiation-resistant paint.

4. The environment-adaptive induction lamp string according to claim 1, wherein the environmental sensor comprises a brightness sensor, a temperature sensor, a radiation sensor, and an infrared sensor, and the other end of the induction lamp string is equipped with a relative light sensor.

5. The environment-adaptive induction lamp string according to claim 1, wherein the control center adjusts the luminous and shielding performance using a scene weighting algorithm, with the formula for the weighting algorithm as follows:

$$Bm = By \times \left[1 - \alpha\left(\frac{Lnow}{L\max}\right)\right] + M \times \beta \times Bup$$

where Bm represents object brightness, By is the reference brightness set for the current induction lamp, α is the weighting coefficient, Lmax is the maximum brightness value, Lnow is the current ambient light intensity, M is the human activity intensity, and β×Bup is the brightness increment.

6. A method for manufacturing an environment-adaptive induction lamp string, used for manufacturing the environment-adaptive induction lamp string according to claim 1, comprising the following steps:

S1, applying radiation-resistant paint onto an inner wall of a lampshade, covering the same with a transparent protective layer, and fitting a sealing ring at an edge of the lampshade;

S2, sequentially fitting an insulating layer, a shielding layer, and a rubber protective layer around a connecting wire;

S3, assembling a metal grid and immersing the shaped metal grid in radiation-resistant paint;

S4, attaching a metal core rod to an outer side of a magnetic core, with a phase change thermal storage layer between the magnetic core and the metal core rod, inserting a thermal conduction rod into the magnetic core, and connecting the thermal conduction rod to the metal core rod via cooling fins;

S5, coating an outer surface of the metal core rod with a shielding coating and winding a reverse parallel-wound coil around the same;

S6, welding the connecting wires of individual induction lamps to form an induction lamp string, and installing an environmental sensor and a relative light sensor at two ends of the induction lamp string respectively; and S7, activating the induction lamps and measuring a difference between an electromagnetic radiation amount El and a threshold Ed, classifying as unqualified if El>Ed, covering the environmental sensor to verify the linked response, and validating the coordinated adjustment of lighting and shielding by changing environmental parameters.

7. The method for manufacturing an environment-adaptive induction lamp string according to claim 6, wherein in S7, environmental data weights for the electromagnetic radiation threshold Ed are differentially allocated according to factory and home environments.

8. The method for manufacturing an environment-adaptive induction lamp string according to claim 7, wherein in the factory setting, a temperature weight is ≥0.4 and a radiation weight is ≥0.3; and in the home setting, a brightness weight is ≥0.4 and a human activity weight is ≥0.3.

9. The method for manufacturing an environment-adaptive induction lamp string according to claim 6, wherein in S3, by altering ambient brightness, temperature, and human activity intensity, it is detected whether the coordinated adjustment of the luminous parameters of the induction lamp and the shielding effectiveness of the composite shielding module is triggered.

10. The method for manufacturing an environment-adaptive induction lamp string according to claim 6, wherein the composite shielding module and the environmental sensor are linked through the control center.

* * * * *